United States Patent [19]

Nakazawa et al.

[11] Patent Number: 4,811,829

[45] Date of Patent: Mar. 14, 1989

[54] FRAME OF PASSENGER CONVEYOR

[75] Inventors: Hayashi Nakazawa; Hiroumi Iyoda, both of Katsuta; Makoto Ueta, Mito, all of Japan

[73] Assignees: Hitachi Ltd .; Hitachi Elevator Engineering Co., both of Tokyo, Japan

[21] Appl. No.: 46,734

[22] Filed: May 7, 1987

[30] Foreign Application Priority Data

May 10, 1986 [JP] Japan .............................. 61-106978

[51] Int. Cl.⁴ .............................................. B65G 21/02

[52] U.S. Cl. .................................... 198/326; 198/632; 198/860.2; 403/14; 52/726

[58] Field of Search .................. 198/860.1, 860.2, 632, 198/321, 325-338; 212/177; 52/643, 645, 726, 729, 730; 403/13, 14

[56] References Cited

U.S. PATENT DOCUMENTS 2,936,872 5/1960 Kneipp ................................ 198/326

3,431,694 3/1969 Hunnebeck ........................ 52/645 X

FOREIGN PATENT DOCUMENTS 2314120 9/1974 Fed. Rep. of Germany ...... 198/326

3247231 7/1983 Fed. Rep. of Germany ... 198/860.2

0031187 3/1979 Japan .................................. 198/326

*Primary Examiner*—Robert J. Spar

*Assistant Examiner*—Lyle Kimms

*Attorney, Agent, or Firm*—Antonelli, Terry & Wands

[57] ABSTRACT

A main frame of a passenger conveyor has a plurality of frame sections divided along the length thereof. Each adjacent pair of frame sections have opposed joint members provided at joint portions of the frame sections. When the frame sections are provisionally assembled, one of the joint members is formed therein with a positioning hole whereas the other joint member is fixedly connected with a positioning pin which, when the frame sections are re-assembled at an installation site, is engaged with the positioning hole to facilitate easy and quick re-assembly of the frame sections.

8 Claims, 2 Drawing Sheets

FRAME OF PASSENGER CONVEYOR

BACKGROUND OF THE INVENTION

The present invention relates to a passenger conveyor such as an escalator, electrically-driven passageway and so forth. More particularly, the present invention is concerned with the structure of a main frame of a passenger conveyor which can be divided into a plurality of sections along the length thereof.

In general, the main frame of a passenger conveyor is so constructed as to be divided into a plurality of sections along the length thereof in order to facilitate transportation to an installation site. Each section is provided with joint portions at which adjacent sections are connected simply by means of bolts in a manner disclosed in Japanese Utility Mcdel Laid-Open Publication No. 61169/1984.

The work for connecting the sections of the main frame of a passenger conveyor requires complicated steps such as adjustment of relative positions between adjacent frame sections. However, the frame sections cannot be assembled with a high degree of precision; namely, it is quite difficult to reassemble the frame sections exactly in the same state as obtained in the factory. In consequence, it is required to re-adjust at the installation site various parts and instruments which have been attached to the frame sections and adjusted in the factory.

SUMMARY OF THE INVENTION

Accordingly, an object of the present invention is to provide a main frame of a passenger conveyor which comprises a plurality of frame sections divided along the length of the main frame and which are provisionally assembled and then disassembled in a factory and, then, re-assembled in an installation site into the same state as has been obtained in the factory.

In the passenger conveyor main frame according to the present invention, each adjacent pair of frame sections are connected at their joint portions which include substantially parallel joint members respectively extending substantially transversely of the length of the main frame. One of the joint members is formed therein with a positioning hole whereas the other joint member carries thereon a positioning pin secured thereto when the frame sections are provisionally assembled.

When frame sections, which have been provisionally assembled and disassembled in a factory, are re-assembled in an installation site, the positioning pin and hole are engaged to precisely position the frame members relative to each other and, thereafter, the frame sections can simply (i.e., without any adjustment) be finally connected and secured together by bolts into the same state as has been obtained in the factory.

DESCRIPTION OF A PREFERRED EMBODIMENT

Figure 1:
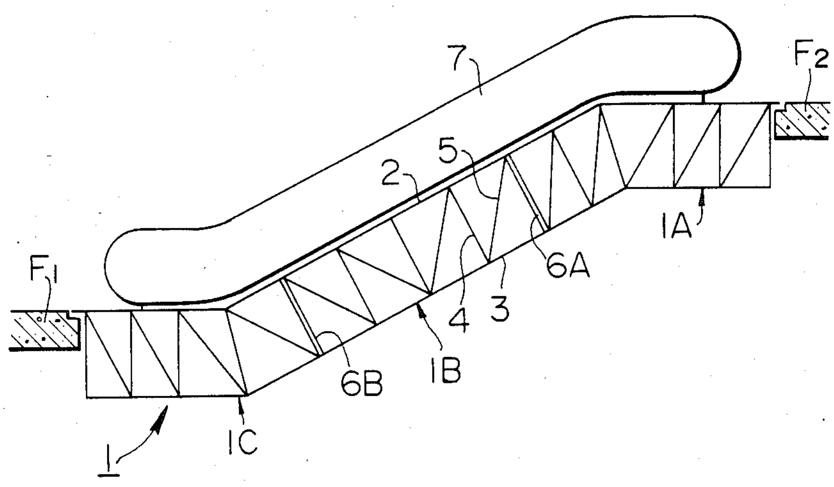
FIG. 1 is a schematic side elevational view of one embodiment of the main frame of a passenger conveyor in accordance with the present invention.
Figure 2:
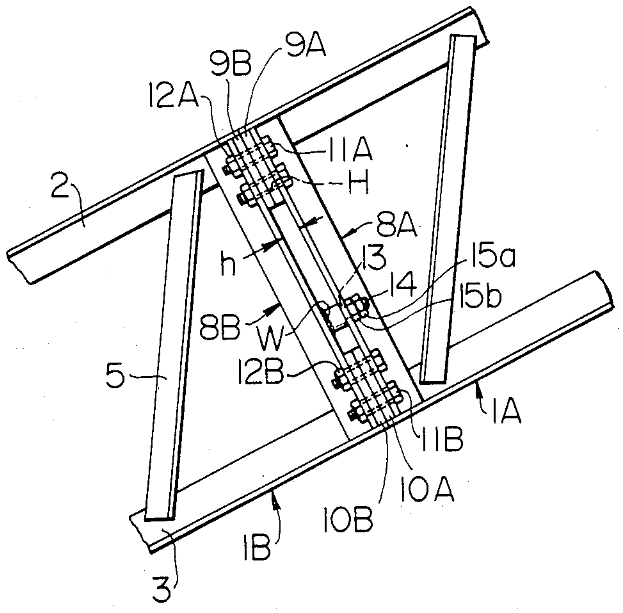
FIG. 2 is an enlarged side elevational view of joint portions at which adjacent frame sections are connected.
Figure 3:
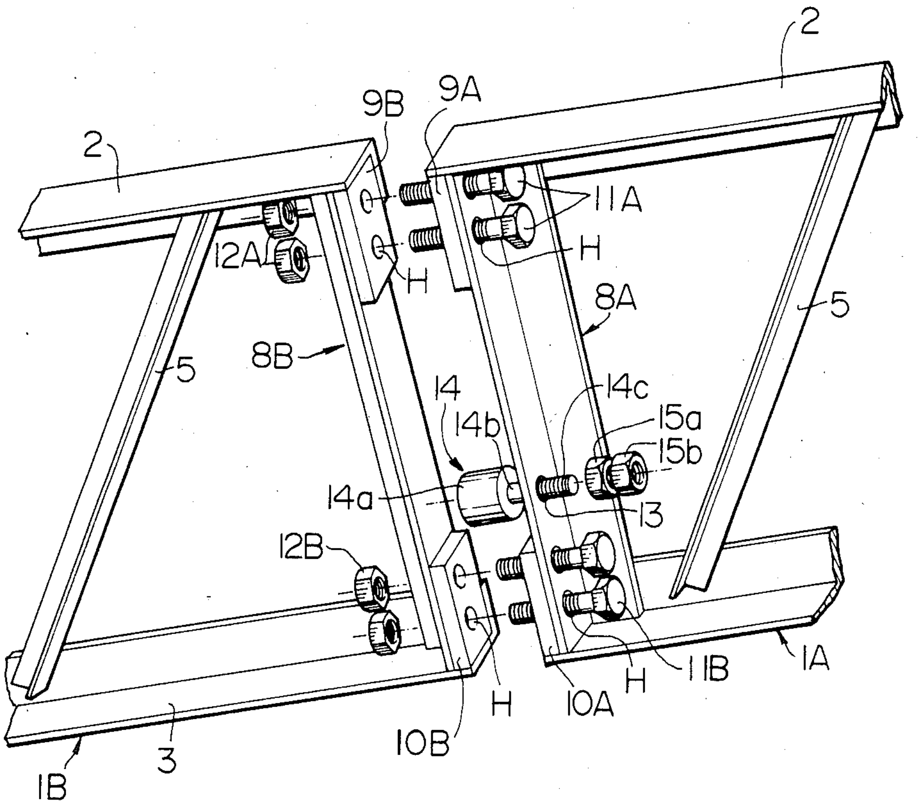
FIG. 3 is an enlarged exploded perspective view of the joint portions shown in FIG. 2.

A preferred embodiment of the present invention will be described hereinunder with reference to FIGS. 1 to 3.

A passenger conveyor has a main frame 1 which extends between two adjacent floors $F_1$ and $F_2$ of a building. The main frame 1 is composed of side structures on both lateral sides of the passenger conveyor and connecting members (not shown) by which both side structures are connected to each other. Thus, the main frame as a whole exhibits a quadrilateral cross-section. Each of the side structures includes an upper member 2 and a lower member 3 both extending along the length of the main conveyor and transverse members 4 and slant members 5 through which the upper and lower members are connected to each other. These members are rigidly connected by, for example, welding.

In order to facilitate the transportation to an installation site, the main frame 1 is so constructed as to be divided into a plurality of sections. In the illustrated embodiment, the main frame 1 can be disassembled into three sections 1A, 1B and 1C at points in an inclined portion thereof and these sections 1A~1C are connected at joint portions 6A and 6B.

For instance, the joint portion 6A at which the frame sections 1A and 1B are connected to each other has transverse joint members 8A and 8B provided on the opposite ends of these frame sections 1A and 1B and extending transversely of the main frame. Each of the joint members is connected rigidly to and extends between the ends of the upper member 2 and the lower member 3 of the side structure of the associated frame section.

Considering that the strength of the joint portion 6A largely depends on the strength of the joint members 8A and 8B, the connections between each joint member and the associated upper and lower members 2 and 3 may be reinforced by suitable reinforcement members. The joint members 8A and 8B are made of L-shaped angle members and arranged such that one side of these angle members 8A and 8B on both frame sections 1A and 1B face each other. Upper and lower portions of the joint members 8A and 8B are provided on their opposing surfaces with mounting seats 9A, 9B and 10A, 10B. Bolt holes H are formed through the mounting seats 9A, 9B, 10A and 10B and the joint members 8A and 8B. The joint member 8A is provided with a positioning hole 13 at a point thereof adjacent to the mounting seat 10A. A positioning pin 14 adapted to be received in the hole 13 with a small tolerance has a large-diameter head portion *14a*, an intermediate engaging portion *14b* for engagement with the hole 13 and a threaded portion *14c* adjacent to the free end of the engaging portion *14b*.

The axial dimension of the large-diameter portion *14a* is equal to or smaller than the size h (see FIG. 2) of the gap which is formed between both joint members 8A and 8B when these members are brought together with the mounting seats 9A, 9B and 10A, 10B sandwiched therebetween.

The positioning pin 14 is attached to the joint member 8B in a manner which will be explained hereinunder. When the main frame of the passenger conveyor is provisionally assembled in a factory, the frame sections 1A and 1B which are to be connected to each other are brought together and bolts 11A and 11B are inserted into corresponding bolt holes H. Then, nuts 12A and 12B are tentatively tightened on these bolts 11A, 11B. At the same time, the engaging portion 14*b* of the positioning pin 14 is inserted into the positioning hole 13 from the side adjacent to the frame section 1B. The mutual positional relationship between the frame sections 1A and 1B are then adjusted in this state, followed by complete tightening of the bolts 12A and 12B. Then, various parts or instruments mounted on the respective frame sections are adjusted of their positions and then fixed. Thus, the frame sections and the associated parts and instruments are correctly located and fixed with respect to one another. Subsequently, the end of the large-diameter portion 14A of the positioning pin 14 is brought into contact with the joint member 8B and is welded thereto as at W so that the positioning pin 14 is fixed to the joint member 8B. In this embodiment, at least one such locating pin 14 is provided on the joint member at each joint portion of each frame section of each side structure of the main frame. Thus, the above-described structure of the joint portion 6A is also true with the other joint portion 6B.

The main frame 1 of a passenger conveyor thus assembled in the factory is then disassembled into independent frame sections for facilitating transportation to the site and setting in a building and then re-assembled at the site. During the re-assembly, the same positional relationship between the adjacent frame sections as that attained in the factory is recovered by inserting the positioning pin 14 into the associated positioning hole 13 and then tightening the nuts 12A and 12B on the bolts 11A and 11B. Thus, the main frame of a passenger conveyor in accordance with the present invention eliminates all the troublesome works which has heretofore been necessary for the purpose of re-adjustment of the positions of the frame sections and other parts installed on these frame sections. Finally, lock nuts 15*a* and 15*b* are screwed onto the threaded portion 14*c* of the pin 14 so as to serve as stopper nuts.

In the described embodiment, the positioning hole 13 and the positioning pin 14 are positioned closer to the lower mounting seats 10A and 10B than to the upper mounting seats 9A and 9B, and lock nuts 15*a* and 15*b* are screwed onto the threaded portion 14*c* of the positioning pin 14. With this arrangement, the positioning pin 14 and the lock nuts 15*a* and 15*b* can serve also as an auxiliary connecting means which keeps both frame sections firmly connected each other in the event that the bolts 11B in the lower mounting seats 10A and 10B are accidentally broken to allow the adjacent frame sections to be spaced apart at their lower sides, thus preventing accidental collapse and falling down of the main frame 1.

As has been described, according to the present invention, it is possible to re-assemble frame sections of a passenger conveyor at an installation site easily and with a high degree of reproducibility. This remarkable merit can be attained solely by providing one additional element, i.e., the positioning pin, on one of the joint members of each joint portion and forming a hole in the other joint member.

What is claimed is:

1. A main frame of a passenger conveyor extending between floors of a building and having a cross-section defined by opposite side structures and connecting members interconnecting said side structures, each of said side structures including a plurality of frame sections divided along the length thereof and having joint portions at which said sections are connected together, each frame section including upper and lower frame members, wherein the joint portions of each adjacent pair of frame sections include substantially parallel joint members respectively extending substantially transversly of the length of the side structure and having upper and lower end portions connected together by bolts and nuts, and one of said joint members is provided therein intermediate the nuts and bolts connecting said end portions with a positioning hole and the other joint member has affixed thereon a positioning pin previously located so as to be opposed to and engaged with said positioning hole and secured to said other joint member between the parallel joint members.

2. A main frame for a passenger conveyor according to claim 1, wherein said positioning pin includes an engaging portion engaged with said positioning pin includes an threaded portion adjacent to said engaging portion, and wherein said joint portions further include a lock nut threaded onto said threaded portion of said positioning pin.

3. A main frame for a passenger conveyor according to claim 1, wherein said positioning pin is located at a level below a middle point of a height of the side structure.

4. A main frame for a passenger conveyor extending between floors of a building and having a quadrilateral cross-section defined by opposite side structures and connecting members interconnecting said side structures, each of said side structures including a plurality of frame sections divided along the length thereof and having joint portions at which said sections are connected together, each frame section including upper and lower frame members, the joint portions of each adjacent pair of frame sections include substantially parallel joint members respectively extending substantially transversely of the length of the side structure and having upper and lower end portions connected together by bolts and nuts, and one of said joint members is provided therein intermediate said end portions with a positioning hole and the other joint member has affixed thereon a positioning pin previously located so as to be engaged with said positioning hole and secured to said other joint at, wherein each of said side structures includes upper and lower members and transverse and slant members which interconnect said upper and lower members, wherein the joint members of joint portions of adjacent pair of frame sections have opposed upper and lower portions provided with mounting seats, said joint members and said mounting seats being formed therein with bolt holes extending therethrough and receiving said bolts, and wherein said positioning pin includes a large-diameter head portion of an axial dimension less than a space defined between an adjacent pair of joint members and determined by the mounting seats thereof, an engaging portion engaged with said positioning hole and a threaded portion adjacent to a free end of said positioning pin, said threaded portion being adapted to receive a lock nut thereon.

5. A main frame for a passenger conveyor according to claim 1, wherein said frame includes a inclined portion, and said joint portions are all disposed in said inclined portion.

6. A main frame of a passenger conveyor extending between floors of a building and having a cross-section defined by opposite side structures an d connecting members interconnecting said side structures, each of said side structures including a plurality of frame sections divided along the length thereof and having joint portions at which said sections are connected together, each frame section including upper and lower frame members, wherein the joint portions of each adjacent pair of frame sections include substantially parallel joint members respectively extending substantially transversely of the length of the side structure and having upper and lower end portions connected together by bolts and nuts, wherein one of said joint members is provided therein with a positioning hole between the bolts and nuts connecting the upper and lower portions and the other joint member has affixed thereon a positioning pin opposite to and engaged with said positioning hole and secured to said other joint member between the parallel joint members, wherein said positioning pin is located at a level below a middle point of a height of the side structure and includes an engaging portion engaged with said positioning hole and a threaded portion adjacent to said engaging portion, and wherein said joint portions further include a lock nut threaded onto said threaded portion of said positioning pin.

7. A main frame for a passenger conveyor according to claim 6, wherein each of said side structures includes upper and lower members and transverse and slant members which interconnect said upper and lower members, wherein the joint members of joint portions of adjacent pair frame sections have opposed upper and lower portions provided with mounting seats said joint members and said mounting seats being formed therein with bolt holes extending therethrough and receiving said bolts, and wherein said positioning pin further includes a large-diameter head portion of an axial dimension less than a space defined between an adjacent pair of joint members and determined by mounting seats thereof, said head portion being secured to said the other joint member, and said threaded portion being adjacent to a free end of said positioning pin.

8. A main frame for a passenger conveyor according to claim 6, wherein said frame includes an inclined portion and said joint portions are all disposed in said inclined portion.

* * * * *